May 31, 1955     L. G. OPEL     2,709,763

COIL SUPPORT FOR DYNAMO-ELECTRIC MACHINE

Filed Aug. 20, 1953

WITNESSES:
John E. Healy
Leon M. Garman

INVENTOR
Lawrence G. Opel.
BY
ATTORNEY

United States Patent Office 2,709,763
Patented May 31, 1955

2,709,763

COIL SUPPORT FOR DYNAMO-ELECTRIC MACHINE

Lawrence G. Opel, Tonawanda, N. Y., assignor to Westinghouse Electric Corporation, East Pittsburgh, Pa., a corporation of Pennsylvania Application August 20, 1953, Serial No. 375,459

4 Claims. (Cl. 310—194)

The present invention relates to coil supports and, more particularly, to a coil support for the commutating field coils of direct-current dynamoelectric machines.

The commutating field coils which provide the necessary commutating flux in a direct-current dynamoelectric machine are placed on salient pole pieces mounted on the frame of the machine between the main poles. These coils are usually wound on insulating tubes or forms which have rounded ends, so that the coils are necessarily longer than the pole pieces in the axial direction of the machine. The coils therefore do not fit tightly on the pole pieces and would be free to move axially of the machine if they were not adequately supported and prevented from moving.

In the conventional practice, when solid pole pieces are used, the corners of the pole pieces have been rounded, to prevent damaging the coil insulation by the sharp edges, and steel straps have been fastened to the ends of the pole piece and bent over the coil to hold the coil in place. When laminated pole pieces have been used, half-round wood blocks have been fastened to the ends of the pole piece, to prevent axial movement of the coil and to protect the coil, and a spring has been placed between the coil and the frame to hold the coil in place. Both of these arrangements are undesirable, however, since they require extra machining of the pole pieces and require additional parts to be fastened to the pole pieces for supporting the coil.

The principal object of the present invention is to provide a coil support for coils disposed on salient pole pieces which is self-supporting and does not have to be fastened to the pole piece or the frame of the machine, and which is relatively inexpensive.

Another object of the invention is to provide a coil support for coils disposed on salient pole pieces which makes it possible to use a simple and inexpensive pole piece with no extra parts attached to it for supporting the coil and with no extra machining.

Other objects and advantages of the invention will be apparent from the following detailed description, taken in connection with the accompanying drawing, in which.

Figure 1:
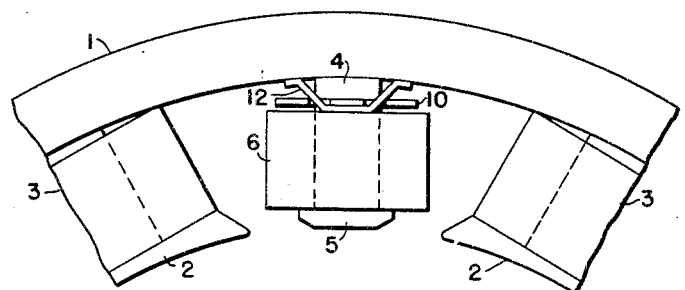
Figure 1 is a partial elevation of a direct-current dynamoelectric machine utilizing the coil support of the present invention.

The coil support of the present invention is particularly applicable to use with the commutating coils of direct-current dynamoelectric machines. The coil support may be used with machines of any type, and is shown in Fig. 1 as applied to a machine having a frame 1 with main pole pieces 2 and main field coils 3. The machine has commutating pole pieces 4 disposed between the main poles. The commutating pole pieces 4 may be of any usual construction, either solid or laminated, and are preferably provided with pole shoes 5 of usual type.

Figure 2:
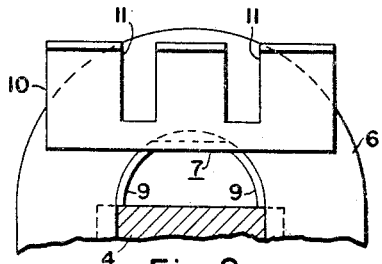
Fig. 2 is a top plan view of one end of a commutating pole and coil with the coil support in place.

A commutating field coil 6 is placed on each commutating pole piece 4. The coil 6 has rounded ends, as shown in Fig. 2, and therefore extends axially of the machine beyond the ends of the pole piece 4 so that if the coil were not supported, it could move axially of the machine with respect to the pole piece.

Figure 4:
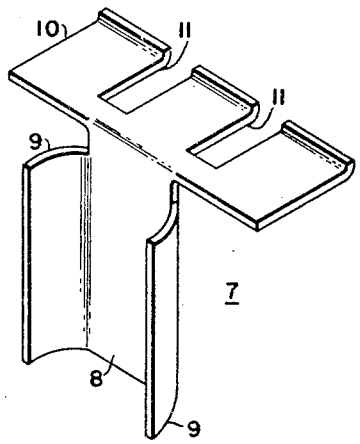
Fig. 4 is a perspective view of the coil support.
Figure 3:
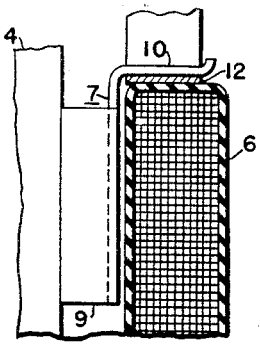
Fig. 3 is a side view of the assembled coil support and coil, the coil being shown in section.

In accordance with the present invention, such movement is prevented, and the coil is retained in position, by a coil support 7. The coil support 7 may be made of sheet metal and has a flat body portion 8. At each side of the body portion 8, a side portion 9 is bent up, as clearly shown in Fig. 4, to form a spacer member. The side portions 9 are rounded to conform to the curvature of the end portion of the coil 6, so that when the spacer is inserted in the coil, the spacer portions 9 engages the interior end surface of the coil as shown in Fig. 2. The coil support 7 also has a top portion 10 which is bent over in the opposite direction from the side portions 9 to extend over the top of the coil. The top portion 10 is provided with transverse slots 11.

In use, a coil support 7 is inserted in each end of the coil 6, with the side portions 9 engaging the interior surface of the coil and the end of the pole piece, and with the top portion 10 extending over the end of the coil. When the pole piece 4 is assembled on the frame 1 of the machine, a leaf spring 12 is inserted in the slots 11 of the top portion 10 and bears against the frame 1 of the machine to hold the coil in place against the pole shoe 5.

It will be seen that the coil support thus holds the coil in position and prevents movement of the coil relative to the pole piece, while the coil support and spring cooperate to hold the coil firmly in place. The coil support 7 is entirely self-supporting and does not require any provision for fastening it to the pole piece or to the frame. Thus, the cost of the pole piece is materially reduced, as compared to the pole pieces which have been used in the conventional practice, since no extra parts must be fastened to the pole piece for supporting the coil, and no extra machining or provisions for attaching coil supports are required. The coil support itself is relatively inexpensive, as it is a simple sheet metal member, and the cost of the entire pole and coil assembly is therefore kept low, while the assembly operation is facilitated.

It should now be apparent that a coil support has been provided which is very advantageous because of its simplicity and low cost. A particular preferred embodiment has been shown and described for the purpose of illustration, but it will be evident that various modifications and other embodiments are possible within the scope of the invention, and the invention is not restricted to the specific construction shown, but in its broadest aspects, it includes all equivalent embodiments and modifications.

I claim as my invention:

1. In a dynamoelectric machine having a frame member with a salient pole piece thereon, a field coil on said pole piece, coil supports between the coil and the pole piece at each end thereof, each of said coil supports having a rounded spacer portion substantially conforming to the shape of the coil and engaging the coil and the pole piece, the coil support also having a top portion extending over the coil, and a spring member engaging said top portion and bearing against the frame member and the coil.

2. In a dynamoelectric machine having a frame member with a salient pole piece thereon, a field coil on said pole piece, coil supports between the coil and the pole piece at each end thereof, each of said coil supports having a rounded spacer portion substantially conforming to the shape of the coil and engaging the coil and the pole piece, the coil support also having a top portion extending over the coil, the top portion having slots therein, and a spring member engaging in said slots and bearing against the frame member and the coil.

3. In a dynamoelectric machine having a frame member with a salient pole piece thereon, a field coil on said pole piece, coil supports between the coil and the pole piece at each end thereof, each of said coil supports having a body portion with side portions extending from the body portion, the side portions engaging the coil and the pole piece and being rounded to substantially conform to the shape of the coil, the coil support also having a top portion extending from the body portion oppositely to the side portions and extending over the coil, and a spring member engaging said top portion and bearing against the frame member and the coil.

4. In a dynamoelectric machine having a frame member with a salient pole piece thereon, a field coil on said pole piece, coil supports between the coil and the pole piece at each end thereof, each of said coil supports having a body portion with side portions extending from the body portion, the side portions engaging the coil and the pole piece and being rounded to substantially conform to the shape of the coil, the coil support also having a top portion extending from the body portion oppositely to the side portions and extending over the coil, the top portion having slots therein, and a spring member engaging in said slots and bearing against the frame member and the coil.

References Cited in the file of this patent

UNITED STATES PATENTS

| | | |
|---|---|---|
| 890,539 | Stull | June 9, 1908 |
| 1,014,904 | Priest | Jan. 16, 1912 |
| 1,086,096 | Starker | Feb. 3, 1914 |

FOREIGN PATENTS

| | | |
|---|---|---|
| 126,561 | Germany | Dec. 19, 1901 |